(12) United States Patent
Kovac

(10) Patent No.: US 7,029,221 B2
(45) Date of Patent: *Apr. 18, 2006

(54) SLEEVE DEVICE WITH INTERNAL FINS FOR HOLDING A PIECE SUCH AS A BOLT IN A BORE

(75) Inventor: Zdravko Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/606,238

(22) Filed: Jun. 26, 2003

(65) Prior Publication Data

US 2004/0022600 A1 Feb. 5, 2004

Related U.S. Application Data

(60) Provisional application No. 60/399,704, filed on Aug. 1, 2002, provisional application No. 60/415,144, filed on Oct. 2, 2002.

(51) Int. Cl.
*F16B 21/18* (2006.01)

(52) U.S. Cl. .................. 411/512; 411/353; 411/999

(58) Field of Classification Search ............... 411/301, 411/352, 353, 512, 525, 526, 908, 970, 982, 411/999

See application file for complete search history.

(56) References Cited

U.S. PATENT DOCUMENTS

| 1,409,606 | A | * | 3/1922 | Stendahl ................... 411/353 |
|---|---|---|---|---|
| 1,499,071 | A | | 6/1924 | Pleister |
| 2,676,508 | A | | 4/1954 | Erickson |
| 2,931,412 | A | | 4/1960 | Wing |
| 3,137,195 | A | | 6/1964 | Rosenberg, Jr. |
| 4,534,101 | A | | 8/1985 | Rosan, Jr. .................... 29/432 |
| 4,558,494 | A | * | 12/1985 | Kraus ......................... 24/297 |
| 4,693,248 | A | * | 9/1987 | Failla ......................... 606/220 |
| 4,787,790 | A | | 11/1988 | Shirai ......................... 411/109 |
| 4,844,677 | A | * | 7/1989 | Schwartzman ............. 411/512 |
| 5,170,984 | A | * | 12/1992 | Ruckwardt .................. 248/635 |
| 5,255,647 | A | * | 10/1993 | Kiczek ................... 411/353 X |
| 5,395,194 | A | | 3/1995 | Johnson et al. ............. 411/353 |
| 5,454,479 | A | * | 10/1995 | Kraus ......................... 220/787 |
| 5,518,349 | A | | 5/1996 | Holub et al. ................. 411/34 |
| 5,645,282 | A | * | 7/1997 | Belter ......................... 277/598 |
| 5,658,110 | A | * | 8/1997 | Kraus ......................... 411/510 |
| RE36,164 | E | | 3/1999 | Johnson et al. ............. 411/353 |

(Continued)

FOREIGN PATENT DOCUMENTS

FR 2 431 057 3/1980

(Continued)

*Primary Examiner*—Flemming Saether
(74) *Attorney, Agent, or Firm*—Miles & Stockbridge P.C.

(57) ABSTRACT

A device for holding a piece in a bore comprises a cylindrical sleeve constructed to be inserted into the bore and held therein by engagement of its outer surface with an inner surface of the bore, and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve. The sleeve and the fins are integrally formed of resilient flexible plastic, and the fins are skewed in a same circumferential direction relative to radial planes of the sleeve. The flexibility of the fins is such that the fins can be readily deflected when engaged by an inserted piece.

57 Claims, 4 Drawing Sheets

U.S. PATENT DOCUMENTS

| | | | |
|---|---|---|---|
| 6,039,525 A | 3/2000 | Johnson | 411/353 |
| 6,059,503 A * | 5/2000 | Johnson | 411/353 |
| 6,267,421 B1 | 7/2001 | Burton | 292/340 |
| 6,280,132 B1 * | 8/2001 | Szczukowski et al. | 411/353 |
| 6,623,226 B1 * | 9/2003 | Braun et al. | 411/970 X |
| 2004/0213645 A1 | 10/2004 | Kovac | 411/512 |

FOREIGN PATENT DOCUMENTS

| | | | |
|---|---|---|---|
| GB | 855297 | 11/1960 | |
| GB | 1006010 | 9/1965 | |
| GB | 1216284 | * 12/1970 | 411/908 |

* cited by examiner

FIG. 5
FIG. 6
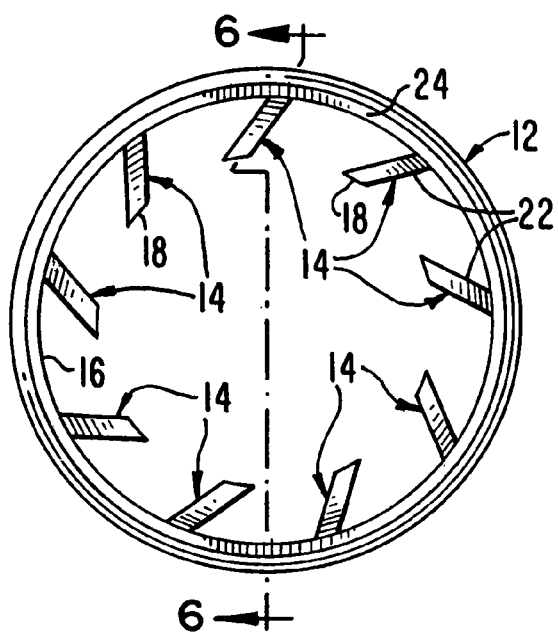
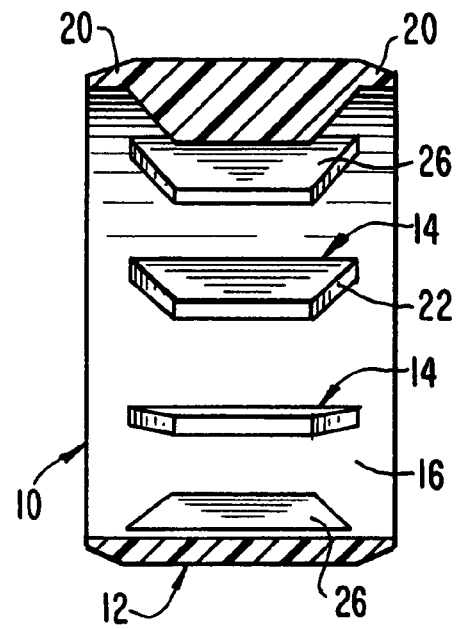
FIG. 7
FIG. 8
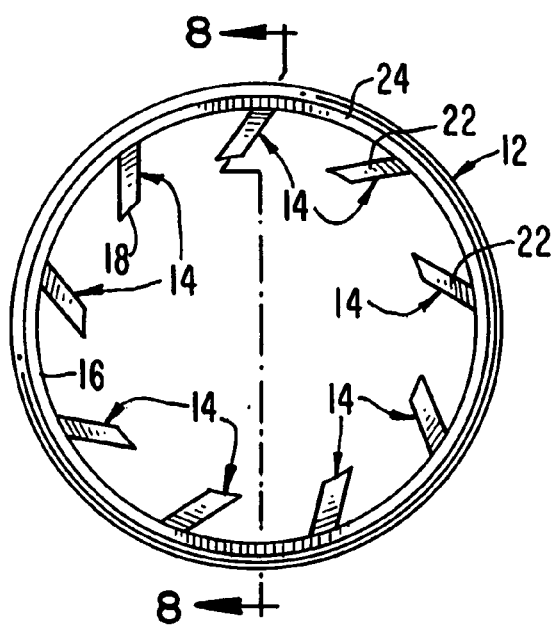
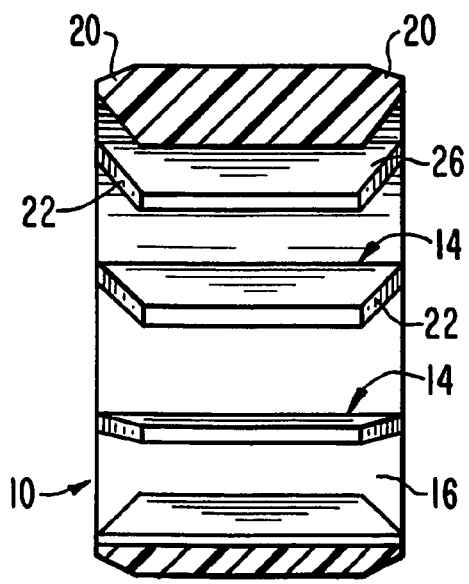

SLEEVE DEVICE WITH INTERNAL FINS FOR HOLDING A PIECE SUCH AS A BOLT IN A BORE

CROSS-REFERENCE TO RELATED APPLICATIONS

This application claims the benefit of Application No. 60/399,704 filed Aug. 1, 2002, and Application No. 60/415,144 filed Oct. 2, 2002, both incorporated herein by reference.

BACKGROUND OF THE INVENTION

This invention relates to a device for holding a piece, such as a fastener, in a bore. The invention will be described in its application to fastener retainers, but it will become apparent that the invention has broader utility.

The use of fastener retainers to pre-attach bolts, studs, or other fasteners to a workpiece, such as a panel, in preparation for a subsequent assembly operation is well known. Such pre-attachment improves production efficiency by eliminating the need for manual placement of the fasteners as parts of the assembly operation. In a typical application, a bolt (or other fastener) is inserted into a plastic annular retainer which is designed to retain the bolt within a smooth-walled bore of a workpiece. The retainer, which has an outer diameter slightly larger than that of the bore, is pressed into the bore, where it is held by resilient frictional engagement with the bore wall, thus pre-attaching the bolt to the workpiece. The workpiece may subsequently be associated with a second workpiece having a threaded bore which is axially aligned with the bore of the first workpiece, and the two workpieces may then be securely assembled to each other by engaging the bolt with the threaded bore of the second workpiece. See, for example, U.S. Pat. No. RE 36,164 and U.S. Pat. No. 6,039,525.

In practical use of such retainers, it is often important that the holding power of the retainer to the fastener and the holding power of the retainer to the workpiece bore be such that the retained fastener may, if inadvertently bumped, slide axially of the retainer without the retainer slipping out of the workpiece bore. It is also desirable to provide a retainer that accommodates misalignment of the bores and that permits the fastener to be tilted relative to the axis of the retainer. Furthermore, it is desirable that the design of the retainer readily accommodate varying requirements for retainer holding power and varying fastener and bore diameters, and that the retainer be capable of being manufactured simply and economically.

SUMMARY OF THE INVENTION

It is an object of the present invention to provide an improved device for holding a piece in a bore, and more particularly, an improved fastener retainer.

It is another object of the invention to provide a device of the foregoing type that is readily adaptable to varying requirements for holding power and that is capable of being manufactured simply and economically.

It is a further object of the invention to provide a unique spacer or washer.

The foregoing objects, as well as other aspects, features and advantages of the invention, will be more fully appreciated from the following description of preferred embodiments taken in conjunction with the accompanying drawings.

BRIEF DESCRIPTION OF THE DRAWINGS

FIG. 5 is an end view of a second embodiment of a device according to the invention;

FIG. 6 is a sectional view taken along line 6—6 in FIG. 5;

FIG. 7 is an end view of a third embodiment of a device according to the invention;

FIG. 8 is sectional view taken along line 8—8 in FIG. 7;

DESCRIPTION OF THE PREFERRED EMBODIMENTS

Figure 1:
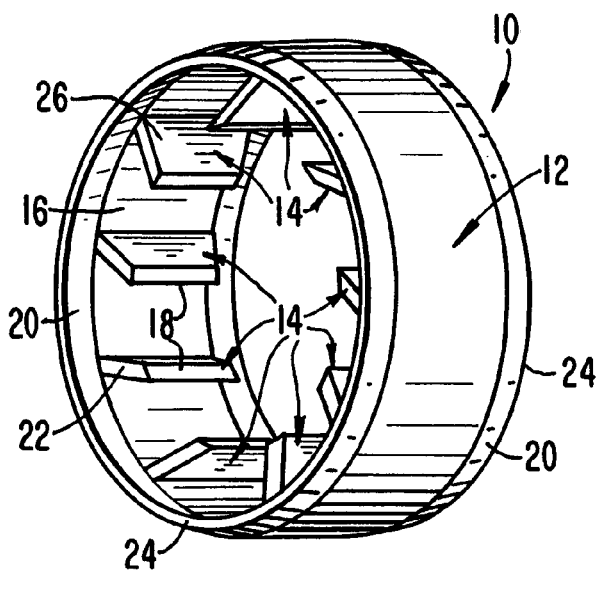
FIG. 1 is a perspective view of a first embodiment of a device according to the invention.
Figure 2:
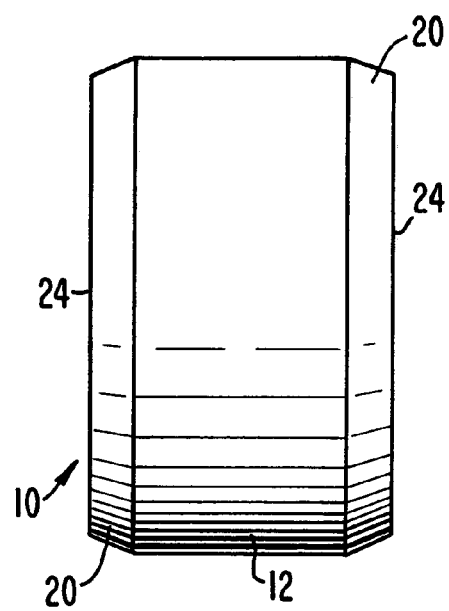
FIG. 2 is a side elevation view of the device of the first embodiment.
Figure 3:
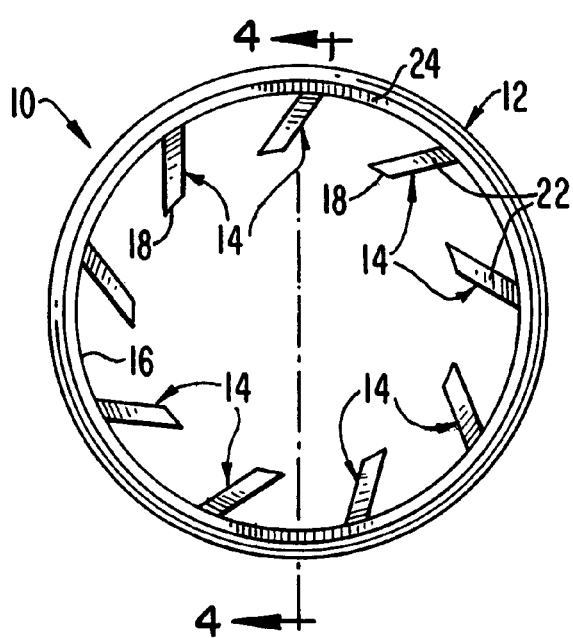
FIG. 3 is an end view of a device of the first embodiment.
Figure 4:
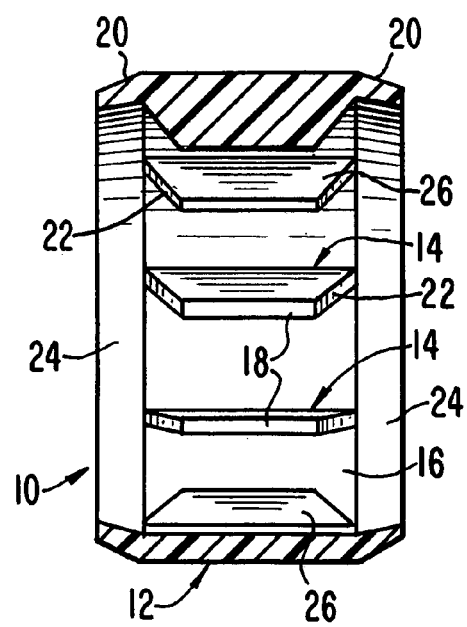
FIG. 4 is a sectional view taken along line 4—4 in FIG. 3.

As shown in FIGS. 1–4, a first embodiment of a device 10 according to the invention comprises a cylindrical sleeve 12 having a series of fins 14 extending longitudinally of an inner surface 16 of the sleeve and projecting inwardly from the inner surface. The fins are spaced from each other circumferentially of the sleeve with tips 18 extending along the length of the sleeve and disposed to engage an outer surface of a piece inserted into the sleeve, as later described. In the embodiment there are nine fins, but the number of fins can be varied to meet the need of particular applications of the invention.

The sleeve and the fins are integrally formed of a resilient flexible plastic, such as a polyester elastomer, and are preferably skewed in a same circumferential direction relative to radial planes of the sleeve. The inclination angles of the fins are preferably uniform. The flexibility of the fins is such that the fins can be readily deflected when engaged by an inserted piece. For this purpose, the dimension of each fin along the direction of its inward projection is preferably substantially greater than the thickness of the fin.

In order to facilitate insertion of the retainer into a bore, either or both of end portions 20 of the sleeve are chamfered. Accordingly, the end portions of the sleeve have an outer diameter that increases away from the respective longitudinal ends of the sleeve.

In the first embodiment, the longitudinal ends 22 of the fins are spaced from the longitudinal ends, respectively, of the sleeve. The end portions 20 of the sleeve have an inner diameter that slightly increases between the respective longitudinal ends of the sleeve and the fins.

To facilitate the insertion of a bolt or other fastener (e.g., a pin or stud) into the retainer, the fins are preferably tapered. To provide the desired taper of the fins, at least one of the longitudinal ends 22 of the fins extends away from the respective longitudinal end 24 of the sleeve and away from the inner surface 16 of the sleeve. The longitudinal side surfaces 26 of the fins are preferably trapezoidal. The longitudinal ends of the sleeve are flat. If the bolt or other fastener is sufficiently tapered at its leading end, the fins need not be tapered, i.e., the longitudinal side surfaces 26 of the fins may be rectangular.

FIGS. 5 and 6 illustrate a second embodiment of the invention, which is similar to the first embodiment except that the inner diameter of the end portions of the sleeve is uniform between the longitudinal ends of the sleeve and the ends of the fins.

FIGS. 7 and 8 illustrate a third embodiment of the invention, in which the fins extend all the way to the longitudinal ends of the sleeve.

Figure 9:
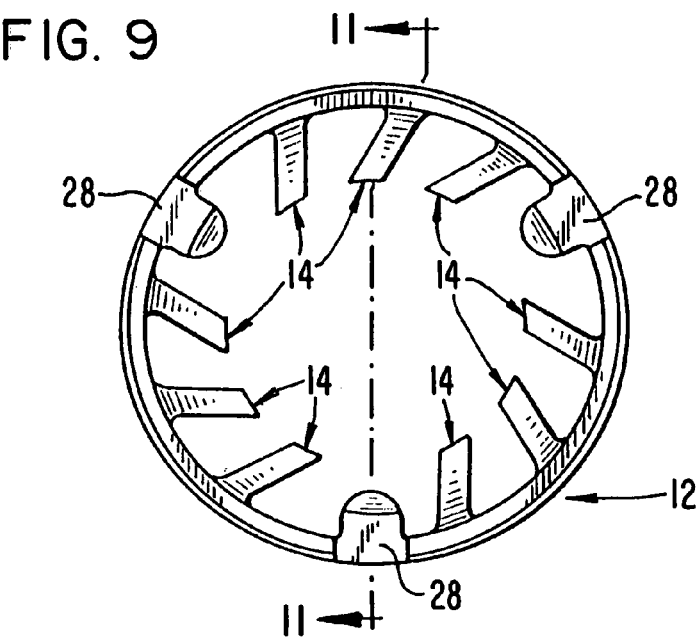
FIG. 9 is an end view of a fourth embodiment of a device according to the invention.
Figure 10:
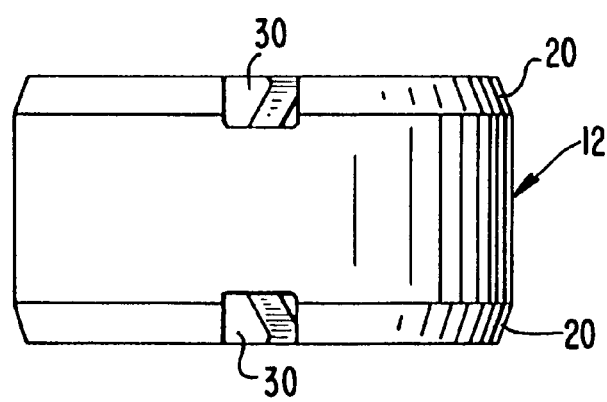
FIG. 10 is a plan view of the device of the fourth embodiment.
Figure 11:
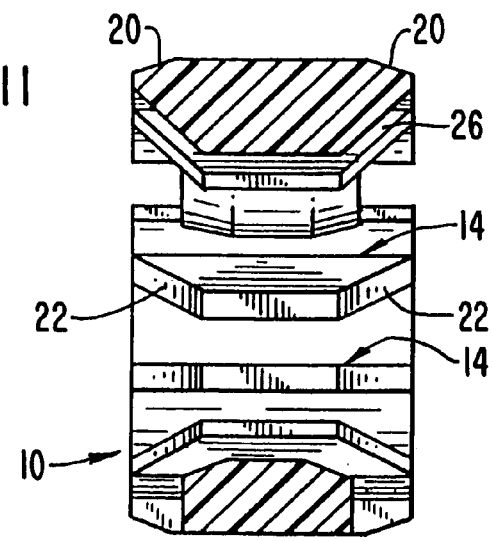
FIG. 11 is a sectional view taken along line 11—11 in FIG. 9.

FIGS. 9–11 illustrate a fourth embodiment of the invention. In this embodiment, the fins are similar to the fins of the third embodiment, but at three locations spaced 120° apart abutments 28 are provided, the ends of which are spaced from the respective longitudinal ends of the sleeve.

In all of the embodiments described, the devices of the invention can be manufactured by injection molding of a plastic such as high-density polyethylene. In the embodiment of FIGS. 9–11, the longitudinal ends of the abutments may engage ejector pins of molding apparatus to eject the molded retainer from a mold. In the form shown, slots 30 are provided in the sleeve for insertion of the ejector pins. The slots may be eliminated if the inward projection of the abutments 28 is sufficient to permit the ejector pins to engage substantially flat surfaces of the abutments internally of the sleeve 12. The inward projection of the abutments (toward the axis of the sleeve) is less than the inward projection of the fins by an amount that is sufficient to ensure that the abutments do not engage a bolt or other fastener inserted axially into the sleeve 12. Opposite longitudinal ends of the abutments may be chamfered or tapered to minimize obstruction to insertion of a fastener in the event of axial misalignment of the fastener with the retainer during insertion.

Figure 12:
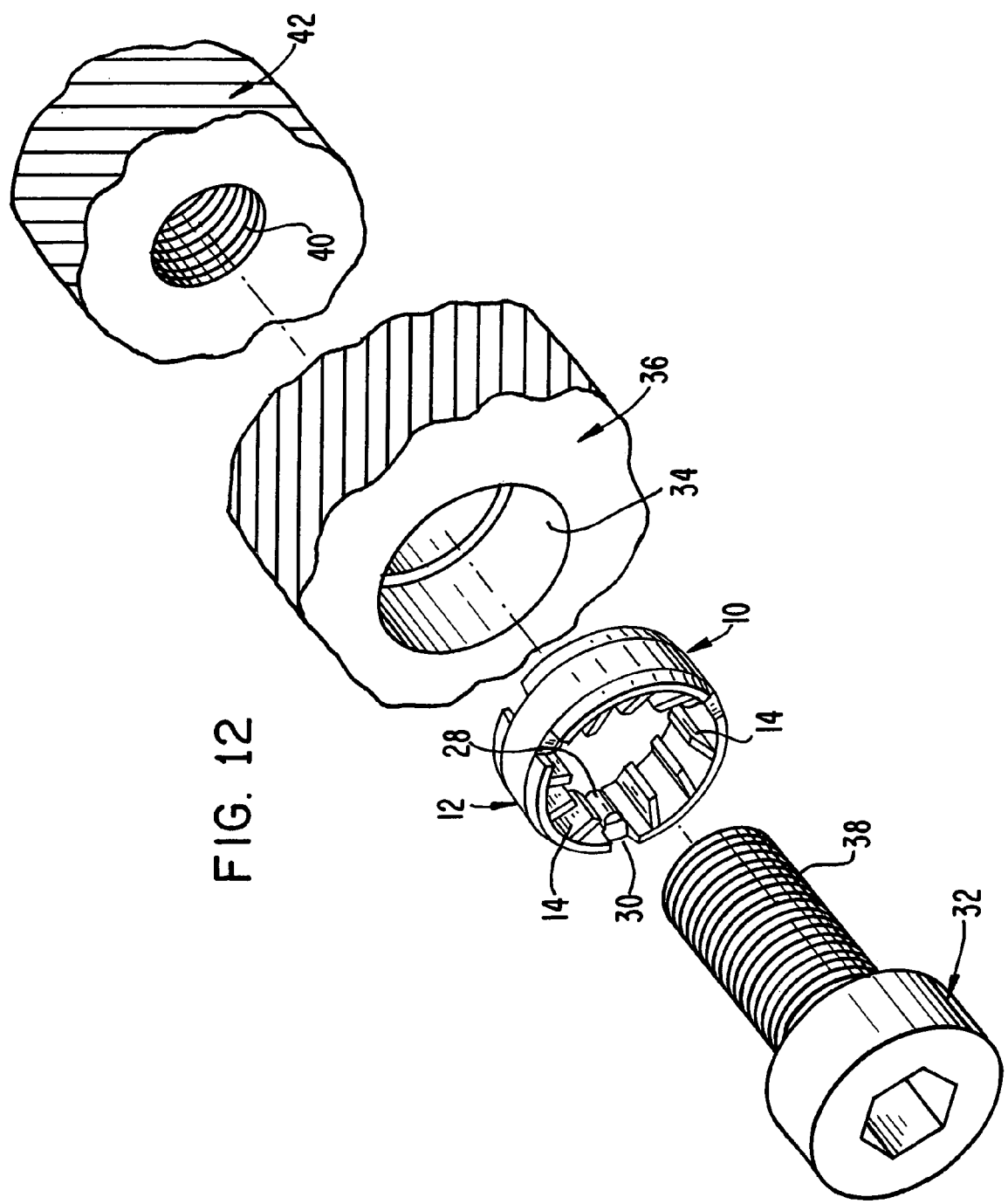
FIG. 12 is an exploded perspective view showing the use of a device of the fourth embodiment as a bolt retainer.

FIG. 12 illustrates the use of a retainer of the fourth embodiment of the invention (representative of the use of all embodiments) for holding a bolt 32 in a bore 34 of a body 36. Typically, the retainer will be pre-assembled with the bolt, and the resulting pre-assembly then inserted into and frictionally engaged with the bore of the body, thus pre-attaching the bolt to the body. However, the retainer may first be pressed into the bore and then the bolt inserted into the retainer.

The outer diameter of the sleeve 12 is slightly greater than the inner diameter of the bore 34 to allow for resilient frictional engagement of the sleeve with the wall of the bore. The diameters of the outer surface of the sleeve and the bore wall are preferably sufficiently close to one another to avoid buckling of the sleeve within the bore, whereby essentially the entirety of the cylindrical outer surface of the sleeve between the chamfered ends will be in engagement with the complementary cylindrical inner surface of the bore.

When the shank 38 of the bolt is pressed into the retainer, the outer surface of the shank (typically the crests of the threads in the case of a bolt) engages the tips of the fins 14 and thereby deflects the fins circumferentially and slightly outwardly. As a result, the fins center the bolt within the sleeve of the retainer and hold the bolt within the retainer. As is apparent in FIG. 12, the bolt may project from the bore 34 of the body 36 for engagement with a threaded bore 40 of a second body 42, thereby to join the second body to the first body. The bodies may be panels to be joined, for example. The construction of the invention accommodates misalignment of the bolt and the retainer as well as misalignment of the bodies to be joined. It is preferred that the frictional force between the outer surface of the sleeve of the retainer and the inner surface of the bore be greater than the frictional force between the bolt and the retainer, so that adjustment of the bolt relative to the retainer does not shift the retainer relative to the bore.

As a non-limiting example of dimensions of a piece-holding device useful in an assembly of the invention with an M6 bolt, the axial length of each sleeve may be about 5.0 mm, and the outer diameter of the sleeve may be about 8.75 mm with a sleeve wall thickness of about 0.625 mm. The fin thickness may be about 0.46 mm. The inward xtension of each fin along one trapezoidal side may be about 1.559 mm and along the opposite trapezoidal side may be about 1.270 mm. Thus, the inward extension of each fin is substantially greater than the thickness of the fin (about three times as great in the embodiment). Also, in the embodiment the fin thickness is substantially uniform, except at the pointed tip. An angle between a radius and the shorter trapezoidal side of a fin may be about 31° 24' 15". An angle defined by radii extending through the intersections of the shorter trapezoidal sides of adjacent fins with the inner surface of the sleeve may be about 40°. The axial length of each fin at its tip may be about 2.9 mm. In their relaxed state, the tips of the fins may lie tangentially on a circle of about 5.494 mm. In the fourth embodiment, the axial length of each abutment 28 may be about 2.99 mm.

While preferred embodiments of the invention have been shown and described, those skilled in the art will recognize that various changes can be made without departing from the principles and spirit of the invention, the scope of which is defined in the appended claims. For example, a device of the invention may be used as a spacer or a washer and may be used in multiples to provide a group of such devices spaced apart for holding a pin or stud in a long bore.

What is claimed is:

1. A device for holding a piece in a bore, comprising:
   a cylindrical sleeve constructed to be inserted into the bore and held therein by engagement of its outer surface with an inner surface of the bore, the ends of the sleeve being substantially identical and exposed for insertion in the bore;
   and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve,
   wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, and a dimension of each fin longitudinally of an inner surface of the sleeve is a plurality of times greater than the thickness of the fin, and the flexibility of the fins is such that the fins can be readily deflected when engaged by an inserted piece.

2. A device according to claim 1, wherein the device is formed of molded plastic.

3. A device according to claim 2, wherein the device further comprises a plurality of abutments projecting inwardly from the inner surface of the sleeve for engagement with ejector pins of molding apparatus, the abutments are spaced inwardly from the longitudinal ends of the sleeve, and the sleeve has slots aligned with the abutments to permit engagement of the ejector pins with the abutments.

4. A device according to claim 1, wherein the longitudinal ends of the fins are spaced from the respective longitudinal ends of the sleeve.

5. A device according to claim 1, wherein the fins extend to the longitudinal ends of the sleeve.

6. A device according to claim 1, wherein end portions of the sleeve adjacent to the longitudinal ends of the sleeve, respectively, have an outer diameter that increases away from the respective longitudinal ends of the sleeve.

7. A device according to claim 6, wherein the longitudinal ends of the fins are spaced from the respective longitudinal ends of the sleeve and said end portions have a substantially uniform inner diameter between the respective longitudinal ends of the sleeve and the fins.

8. A device according to claim 6, wherein the longitudinal ends of the fins are spaced from the respective longitudinal ends of the sleeve and said end portions have an inner diameter that increases between the respective longitudinal ends of the sleeve and the fins.

9. A device according to claim 6, wherein the fins have longitudinal ends that face longitudinal ends of the sleeve, respectively, and the longitudinal ends of the fins extend away from the respective longitudinal ends of the sleeve and away from the inner surface of the sleeve.

10. A device according to claim 1, wherein the longitudinal ends of the sleeve are flat.

11. A device according to claim 1, where the axial length of the sleeve is substantially greater than the wall thickness of the sleeve.

12. A device according to claim 1, wherein there are about 9 fins.

13. A device for holding a piece in a bore, comprising:
a cylindrical sleeve constructed to be inserted into the bore and held therein by engagement of its outer surface with an inner surface of the bore, the ends of the sleeve being substantially identical and exposed for insertion in the bore;
and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve,
wherein the sleeve and the fins are integrally formed of resilient flexible plastic, the fins are skewed relative to radial planes of the sleeve, the flexibility of the fins is such that the fins can be readily deflected when engaged by an inserted piece, and each fin is tapered by having each longitudinal end that extends away from a respective longitudinal end of the sleeve and away from the inner surface of the sleeve.

14. A device according to claim 13, wherein each fin has trapezoidal longitudinal side surfaces.

15. A device according to claim 13, wherein the fins are skewed in a same circumferential direction relative to radial planes of the sleeve and a dimension of each fin along a direction of its inward projection is substantially greater than the thickness of the fin.

16. A device according to claim 13, wherein the device is formed of molded plastic.

17. A device according to claim 16, wherein the device further comprises a plurality of abutments projecting inwardly from the inner surface of the sleeve for engagement with ejector pins of molding apparatus, the abutments are spaced inwardly from the longitudinal ends of the sleeve, and the sleeve has slots aligned with the abutments to permit engagement of the ejector pins with the abutments.

18. A device according to claim 13, wherein the longitudinal ends of the fins are spaced from the respective longitudinal ends of the sleeve.

19. A device according to claim 13, wherein the fins extend to the longitudinal ends of the sleeve.

20. A device according to claim 13, wherein end portions of the sleeve adjacent to the longitudinal ends of the sleeve, respectively, have an outer diameter that increases away from the respective longitudinal ends.

21. A device according to claim 20, wherein the longitudinal ends of the fins are spaced from the respective longitudinal ends of the sleeve and said end portions have a substantially uniform inner diameter between the respective longitudinal ends of the sleeve and the fins.

22. A device according to claim 20, wherein the longitudinal ends of the fins are spaced from the respective longitudinal ends of the sleeve and said end portions have an inner diameter that increases between the respective longitudinal ends of the sleeve and the fins.

23. A device according to claim 13, wherein the longitudinal ends of the sleeve are flat.

24. A device for holding a piece in a bore, comprising:
a cylindrical sleeve constructed to be inserted into the bore and held therein by engagement of its outer surface with an inner surface of the bore;
and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve,
wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, and the flexibility of the fins is such that the fins can be readily deflected when engaged by an inserted piece;
wherein the fins have longitudinal ends that face longitudinal ends of the sleeve, respectively, and each longitudinal end of the fins extends away from the respective longitudinal end of the sleeve and away from the inner surface of the sleeve; and
wherein each fin has trapezoidal longitudinal side surfaces.

25. A device according to claim 24, where the axial length of the sleeve is substantially greater than the wall thickness of the sleeve.

26. A device according to claim 24, wherein there are about 9 fins.

27. A device for holding a piece in a bore, comprising:
a cylindrical sleeve constructed to be inserted into the bore and held therein by engagement of its outer surface with an inner surface of the bore, the ends of the sleeve being substantially identical and exposed for insertion in the bore;
and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve,
wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, and the flexibility of the fins is such that the fins can be readily deflected when engaged by an inserted piece; and wherein end portions of the sleeve adjacent to the longitudinal ends of the sleeve, respectively, have an outer diameter that increases away from the respective longitudinal ends of the sleeve.

28. A device according to claim 27, wherein the longitudinal ends of the fins are spaced from the respective longitudinal ends of the sleeve and said end portions have a substantially uniform inner diameter between the respective longitudinal ends of the sleeve and the fins.

29. A device according to claim 27, wherein the longitudinal ends of the fins are spaced from the respective longitudinal ends of the sleeve and said end portions have an inner diameter that increases between the respective longitudinal ends of the sleeve and the fins.

30. A device according to claim 27, wherein the fins have longitudinal ends that face longitudinal ends of the sleeve, respectively, and at least one longitudinal end of the fins extends away from the respective longitudinal end of the sleeve and away from the inner surface of the sleeve.

31. A device according to claim 30, wherein each fin has trapezoidal longitudinal side surfaces.

32. A device according to claim 27, wherein the device is formed of molded plastic.

33. A device according to claim 32, wherein the device further comprises a plurality of abutments projecting inwardly from the inner surface of the sleeve for engagement with ejector pins of molding apparatus, the abutments are spaced inwardly from the longitudinal ends of the sleeve, and the sleeve has slots aligned with the abutments to permit engagement of the ejector pins with the abutments.

34. A device according to claim 27, wherein the longitudinal ends of the fins are spaced from the respective longitudinal ends of the sleeve.

35. A device according to claim 27, wherein the fins extend to the longitudinal ends of the sleeve.

36. A device according to claim 27, wherein the longitudinal ends of the fins are spaced from the respective longitudinal ends of the sleeve and said end portions have a substantially uniform inner diameter between the respective longitudinal ends of the sleeve and the fins.

37. A device according to claim 27, wherein the longitudinal ends of the fins are spaced from the respective longitudinal ends of the sleeve and said end portions have an inner diameter that increases between the respective longitudinal ends of the sleeve and the fins.

38. A device according to claim 27, wherein the longitudinal ends of the sleeve are flat.

39. A device for holding a piece in a bore, comprising:
a cylindrical sleeve constructed to be inserted into the bore and held therein by engagement of its outer surface with an inner surface of the bore, the ends of the sleeve being substantially identical and exposed for insertion in the bore;
and a series of fins extending longitudinally of an inner surface of the sleeve and projecting inwardly from the inner surface of the sleeve, the fins being spaced from each other circumferentially of the sleeve with tips free from one another and disposed to engage an outer surface of a piece inserted into the sleeve,
wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, and the flexibility of the fins is such that the fins can be readily deflected when engaged by an inserted piece.

40. A device according to claim 39, where the axial length of the sleeve is substantially greater than the wall thickness of the sleeve.

41. A device according to claim 39, wherein there are about 9 fins.

42. A device for holding a piece in a bore, comprising:
a cylindrical sleeve constructed to be inserted into the bore and held therein by engagement of its outer surface with an inner surface of the bore, the ends of the sleeve being substantially identical and exposed for insertion in the bore;
and a series of fins extending longitudinally of an inner surface of the sleeve and projecting inwardly from the inner surface of the sleeve, the fins being spaced from each other circumferentially of the sleeve with tips disposed to engage an outer surface of a piece inserted into the sleeve,
wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, a dimension of each fin longitudinally of the inner surface of the sleeve is substantially greater than a dimension of each fin along a direction of its inward projection, and the flexibility of the fins is such that the fins can be readily deflected when engaged by an inserted piece.

43. A device according to claim 42, wherein the fins have longitudinal ends that face longitudinal ends of the sleeve, respectively, and at least one longitudinal end of the fins extends away from the respective longitudinal end of the sleeve and away from the inner surface of the sleeve.

44. A device according to claim 43, wherein each fin has trapezoidal longitudinal side surfaces.

45. A device according to claim 42, wherein the device is formed of molded plastic.

46. A device according to claim 45, wherein the device further comprises a plurality of abutments projecting inwardly from the inner surface of the sleeve for engagement with ejector pins of molding apparatus, the abutments are spaced inwardly from the longitudinal ends of the sleeve, and the sleeve has slots aligned with the abutments to permit engagement of the ejector pins with the abutments.

47. A device according to claim 42, wherein the longitudinal ends of the fins are spaced from the respective longitudinal ends of the sleeve.

48. A device according to claim 42, wherein the fins extend to the longitudinal ends of the sleeve.

49. A device according to claim 42, wherein end portions of the sleeve adjacent to the longitudinal ends of the sleeve, respectively, have an outer diameter that increases away from the respective longitudinal ends of the sleeve.

50. A device according to claim 49, wherein the longitudinal ends of the fins are spaced from the respective longitudinal ends of the sleeve and said end portions have a substantially uniform inner diameter between the respective longitudinal ends of the sleeve and the fins.

51. A device according to claim 49, wherein the longitudinal ends of the fins are spaced from the respective longitudinal ends of the sleeve and said end portions have an inner diameter that increases between the respective longitudinal ends of the sleeve and the fins.

52. A device according to claim 42, wherein the longitudinal ends of the sleeve are flat.

53. A device according to claim 42, where the axial length of the sleeve is substantially greater than the wall thickness of the sleeve.

54. A device according to claim 42, wherein there are about 9 fins.

55. A device for holding a piece in a bore, comprising:

a cylindrical sleeve constructed to be inserted into the bore and held therein by engagement of its outer surface with an inner surface of the bore, the ends of the sleeve being substantially identical and exposed for insertion in the bore;

and a series of fins extending longitudinally of an inner surface of the sleeve and projecting inwardly from the inner surface of the sleeve, the fins being spaced from each other circumferentially of the sleeve with tips free from one another and disposed to engage an outer surface of a piece inserted into the sleeve, wherein the sleeve and the fins are integrally formed of resilient flexible plastic, the fins are skewed in a same circumferential direction relative to radial planes of the sleeve, a dimension of each fin along a direction of its inward projection is substantially greater than the thickness of the fin, a dimension of each fin longitudinally of an inner surface of the sleeve is a plurality of times greater than the thickness of the fin and is substantially greater than a dimension of each fin along a direction of its inward projection, and the flexibility of the fins is such that the fins can be readily deflected when engaged by an inserted piece.

56. A device according to claim 55, where the axial length of the sleeve is substantially greater than the wall thickness of the sleeve.

57. A device according to claim 55, wherein there are about 9 fins.

* * * * *